US012687290B2

(12) United States Patent
Hanson

(10) Patent No.: US 12,687,290 B2
(45) Date of Patent: Jul. 21, 2026

(54) ATTACHABLE PEDICURE LAMP DEVICE

(71) Applicant: Jamie Hanson, Missoula, MT (US)

(72) Inventor: Jamie Hanson, Missoula, MT (US)

( * ) Notice: Subject to any disclaimer, the term of this patent is extended or adjusted under 35 U.S.C. 154(b) by 0 days.

(21) Appl. No.: 19/032,541

(22) Filed: Jan. 21, 2025

(65) Prior Publication Data

US 2025/0377096 A1 Dec. 11, 2025

Related U.S. Application Data

(60) Provisional application No. 63/656,620, filed on Jun. 6, 2024.

(51) Int. Cl.

| | |
|---|---|
| ***F21V 33/00*** | (2006.01) |
| ***A45D 29/00*** | (2006.01) |
| ***B05D 3/06*** | (2006.01) |
| ***F21S 9/02*** | (2006.01) |
| ***F21V 21/088*** | (2006.01) |
| ***F21V 21/29*** | (2006.01) |

(Continued)

(52) U.S. Cl.

CPC ............ *F21V 33/004* (2013.01); *A45D 29/00* (2013.01); *B05D 3/061* (2013.01); *B05D 3/067* (2013.01); *F21S 9/02* (2013.01); *F21V 21/088* (2013.01); *F21V 21/29* (2013.01); *F21V 23/002* (2013.01); *F21V 23/0471* (2013.01); *F21Y 2113/10* (2016.08); *F21Y 2115/10* (2016.08)

(58) Field of Classification Search

CPC .. F21V 33/004; F21V 23/002; F21V 23/0471; F21V 21/088; F21V 21/29; B05D 3/067; B05D 3/061; A45D 29/00; A61N 5/06

USPC ........................................ 362/253, 234, 413

See application file for complete search history.

(56) References Cited

U.S. PATENT DOCUMENTS 2,349,509 A * 5/1944 Marano .................... H05B 3/00 219/390
8,047,671 B2 11/2011 Fan (Continued)

FOREIGN PATENT DOCUMENTS

KR 20230121019 A * 8/2023 .............. F21V 33/00
TW 201538884 A * 10/2015 ............ F21V 23/003

OTHER PUBLICATIONS

Machine translation of KR-20230121019-A (Aug. 17, 2023) (Year: 2023).*

*Primary Examiner* — Laura K Tso
(74) *Attorney, Agent, or Firm* — Brennan, Manna & Diamond, LLC

(57) ABSTRACT

An attachable pedicure lamp device is provided. The device is comprised of a pedicure lamp device designed to provide professional-grade lighting and versatility for nail technicians, comprising a base fastener for secure attachment to various surfaces, an adjustable arm for precise positioning, and an advanced lamp head tailored for nail treatments. The base fastener incorporates mechanisms such as clamps, magnets, or suction fasteners, paired with a 360-degree swivel joint for multidirectional adjustment. The adjustable arm facilitates movement and includes integrated cable management. The lamp head features UV and LED light sources for curing and illumination, a programmable timer, motion-activated sensors, and a reflective inner surface for even light distribution. Power options include a rechargeable battery or a cord, with LED indicators for battery status, ensuring functionality and convenience.

9 Claims, 2 Drawing Sheets

(51) Int. Cl.

| | |
|---|---|
| ***F21V 23/00*** | (2015.01) |
| ***F21V 23/04*** | (2006.01) |
| ***F21Y 113/10*** | (2016.01) |
| ***F21Y 115/10*** | (2016.01) |

(56) References Cited

U.S. PATENT DOCUMENTS

| | | | | |
|---|---|---|---|---|
| 8,835,886 | B2 | 9/2014 | Vu | |
| 9,713,371 | B1 * | 7/2017 | Luu | A45D 29/00 |
| 10,016,043 | B1 * | 7/2018 | Cheng | F26B 9/003 |
| 10,448,723 | B1 * | 10/2019 | Coefield | B29C 35/08 |
| 2011/0011045 | A1 * | 1/2011 | Ton | F21V 33/0088<br>55/385.1 |
| 2011/0019392 | A1 | 1/2011 | Fan | |
| 2012/0187311 | A1 * | 7/2012 | Vu | A45D 29/001<br>250/492.1 |
| 2015/0265027 | A1 * | 9/2015 | Wan | A45D 29/00<br>34/275 |

* cited by examiner

ATTACHABLE PEDICURE LAMP DEVICE

CROSS-REFERENCE TO RELATED APPLICATION

The present application claims priority to, and the benefit of, U.S. Provisional Application No. 63/656,620, which was filed on Jun. 6, 2024, and is incorporated herein by reference in its entirety.

FIELD OF THE INVENTION

The present invention relates generally to the field of pedicure lamps. More specifically, the present invention relates to a pedicure lamp device with an attachable fastener and an adjustable arm for customized pedicure lamp positioning. Accordingly, the present disclosure makes specific reference thereto. Nonetheless, it is to be appreciated that aspects of the present invention are also equally applicable to other like applications, devices, and methods of manufacture.

BACKGROUND

Pedicure treatments involve the meticulous application and curing of nail polish, gel polish, or other nail enhancements to ensure a professional finish and long-lasting results. A key element of this process is the use of specialized lamps that emit ultraviolet (UV) or light-emitting diode (LED) light to harden or set nail products. However, traditional pedicure lamps are often handheld, presenting several practical challenges during use. Nail technicians must manually hold the lamp in place while ensuring proper alignment with the client's toenails. This requirement increases the likelihood of accidental bumps or misalignments that can smudge the polish, leading to an unprofessional appearance and necessitating time-consuming corrections. Furthermore, the physical demand of holding the lamp for extended periods can cause fatigue for technicians, particularly during busy schedules or long treatment sessions. The lack of a stable, hands-free solution can also create inefficiencies, as technicians need to focus their attention on securing the lamp rather than on other aspects of the pedicure. For clients, these interruptions can lead to a less satisfying experience.

Therefore, there exists a long-felt need in the art for the attachable pedicure lamp device that provides users with a hands-free solution for curing nail polish. There also exists a long-felt need in the art for the attachable pedicure lamp device that offers flexible and precise positioning to accommodate various treatment setups. Moreover, there exists a long-felt need in the art for the attachable pedicure lamp device that enhances efficiency and professionalism while reducing physical strain on nail technicians.

The subject matter disclosed and claimed herein, in one embodiment thereof, comprises an attachable pedicure lamp device. The device is comprised of a pedicure lamp device designed to provide professional-grade lighting and versatility for nail technicians, comprising a base fastener for secure attachment to various surfaces, an adjustable arm for precise positioning, and an advanced lamp head tailored for nail treatments. The base fastener incorporates mechanisms such as clamps, magnets, or suction fasteners, paired with a 360-degree swivel joint for multidirectional adjustment. The adjustable arm facilitates movement and includes integrated cable management. The lamp head features UV and LED light sources for curing and illumination, a programmable timer, motion-activated sensors, and a reflective inner surface for even light distribution. Power options include a rechargeable battery or a cord, with LED indicators for battery status, ensuring functionality and convenience.

In this manner, the attachable pedicure lamp device of the present invention accomplishes all the forgoing objectives by integrating a secure clamping mechanism that allows it to be attached to various surfaces, including pedicure carts, tables, and armrests. The device includes an adjustable arm with 360-degree swivel joints and locking mechanisms, allowing precise and stable positioning of the lamp head to suit diverse treatment needs. The lamp head features advanced UV and LED light sources, offering customizable intensity settings, programmable timers, and automatic activation sensors for efficient and tailored curing processes. By addressing the challenges of traditional curing methods, the attachable pedicure lamp device significantly improves the workflow, professionalism, and client satisfaction associated with pedicure services.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an attachable pedicure lamp device. The device is comprised of a pedicure lamp configured for secure attachment to various surfaces, offering versatility for professional and mobile nail technicians.

The device includes a base fastener designed to attach to diverse surfaces, such as pedicure carts, tables, or armrests. The fastener, preferably a clamp, may include screw clamps, spring-loaded clamps, quick-release clamps, or alternative mechanisms like clips, magnets, or suction-based fasteners. It incorporates a 360-degree swivel joint allowing vertical and horizontal axis movement, facilitating precise positioning of an adjustable arm without repositioning the device.

The pedicure lamp provides optimal lighting for nail treatments and is connected to the adjustable arm via a ball-and-socket joint permitting 360-degree rotation and multidirectional tilting. Alternative joint types, such as hinge or telescopic joints, may be used. A locking mechanism, including friction-based locks or gear-based mechanisms, ensures stable positioning during extended use.

The lamp head includes a light source comprising UV and/or LED lighting, suitable for curing gel polishes and providing enhanced illumination. The UV light emits wavelengths of approximately 340-400 nm, while the LED light ranges from 365-405 nm for gel curing and 500-700 nm for visible light. A programmable timer offers durations of 10, 30, 60, and 90 seconds, displayed on an LED interface. The lamp head features sensors for automatic activation and deactivation, a curved design for even light distribution, and a reflective inner surface for uniform intensity.

The adjustable arm may be a flexible gooseneck or a multi-jointed arm, incorporating a cable fastener for power cord management to maintain a professional appearance.

Power is supplied via a rechargeable lithium-ion battery with at least one charging port, such as USB-C or micro-USB, or through a power cord. LED indicators on the lamp head display battery status with color-coded alerts for low charge levels. The power cord is routed along the adjustable arm to minimize tangling.

Accordingly, the attachable pedicure lamp device of the present invention is particularly advantageous as it provides a secure clamping mechanism that allows it to be attached to various surfaces, including pedicure carts, tables, and armrests. The device includes an adjustable arm with 360-degree swivel joints and locking mechanisms, allowing precise and stable positioning of the lamp head to suit diverse treatment needs. The lamp head features advanced UV and LED light sources, offering customizable intensity settings, programmable timers, and automatic activation sensors for efficient and tailored curing processes. By addressing the challenges of traditional curing methods, the attachable pedicure lamp device significantly improves the workflow, professionalism, and client satisfaction associated with pedicure services.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
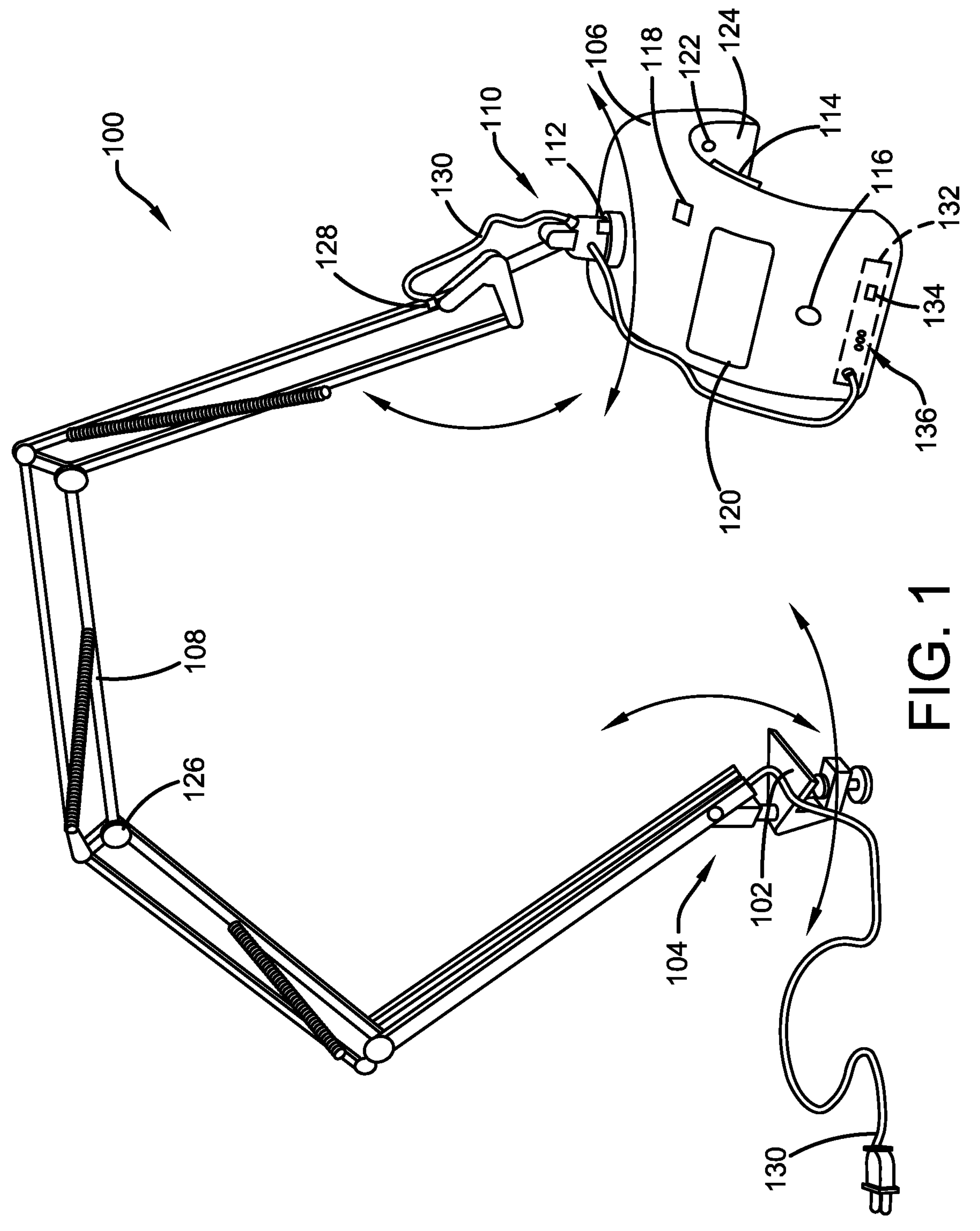
FIG. 1 illustrates a perspective view of one potential embodiment of an attachable pedicure lamp device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for the attachable pedicure lamp device that provides users with a hands-free solution for curing nail polish. There also exists a long-felt need in the art for the attachable pedicure lamp device that offers flexible and precise positioning to accommodate various treatment setups. Moreover, there exists a long-felt need in the art for the attachable pedicure lamp device that enhances efficiency and professionalism while reducing physical strain on nail technicians.

The present invention, in one exemplary embodiment, is comprised of an attachable pedicure lamp device. The device is comprised of a pedicure lamp designed for secure attachment to various surfaces, providing versatility for professional and mobile nail technicians.

The device includes a base fastener configured to attach to surfaces such as pedicure carts, tables, or armrests. The fastener, preferably a clamp, may utilize screw clamps, spring-loaded clamps, quick-release clamps, or alternative mechanisms like clips, magnets, or suction-based fasteners. It features a 360-degree swivel joint enabling movement along vertical and horizontal axes, allowing precise positioning of an adjustable arm without needing to reposition the device.

The pedicure lamp delivers optimal lighting for nail treatments and connects to the adjustable arm through a ball-and-socket joint that allows 360-degree rotation and multidirectional tilting. Alternative joint types, such as hinge or telescopic joints, may also be utilized. A locking mechanism, including friction-based locks or gear-based mechanisms, provides stability during extended use.

The lamp head is equipped with a UV and/or LED light source suitable for curing gel polishes and enhancing illumination. The UV light operates at wavelengths of approximately 340-400 nm, while the LED light ranges from 365-405 nm for gel curing and 500-700 nm for visible light. A programmable timer offers preset durations of 10, 30, 60, and 90 seconds, displayed on an LED interface. The lamp head incorporates sensors for automatic activation and deactivation, a curved design for even light distribution, and a reflective inner surface to ensure uniform intensity.

The adjustable arm may be a flexible gooseneck or a multi-jointed arm and includes a cable fastener to manage the power cord, maintaining a neat appearance.

The device is powered by a rechargeable lithium-ion battery with at least one charging port, such as USB-C or micro-USB, or by a power cord. LED indicators on the lamp head provide battery status with color-coded alerts for low charge levels. The power cord is routed along the adjustable arm to minimize tangling.

The attachable pedicure lamp device is particularly advantageous due to its secure clamping mechanism, allowing attachment to various surfaces. The adjustable arm with 360-degree swivel joints and locking mechanisms enables precise and stable lamp positioning for diverse treatments. The lamp head features advanced UV and LED light sources, customizable intensity settings, programmable timers, and automatic activation sensors, enhancing efficiency and user experience. This design improves workflow, professionalism, and client satisfaction in pedicure services.

Referring initially to the drawings, FIG. 1 illustrates a perspective view of one potential embodiment of an attachable pedicure lamp device 100 of the present invention in accordance with the disclosed architecture. The device 100 is comprised of a pedicure lamp 106 that can be securely attached to a wide range of surfaces, providing versatile positioning and functionality tailored for professional and mobile nail technicians.

Figure 2:
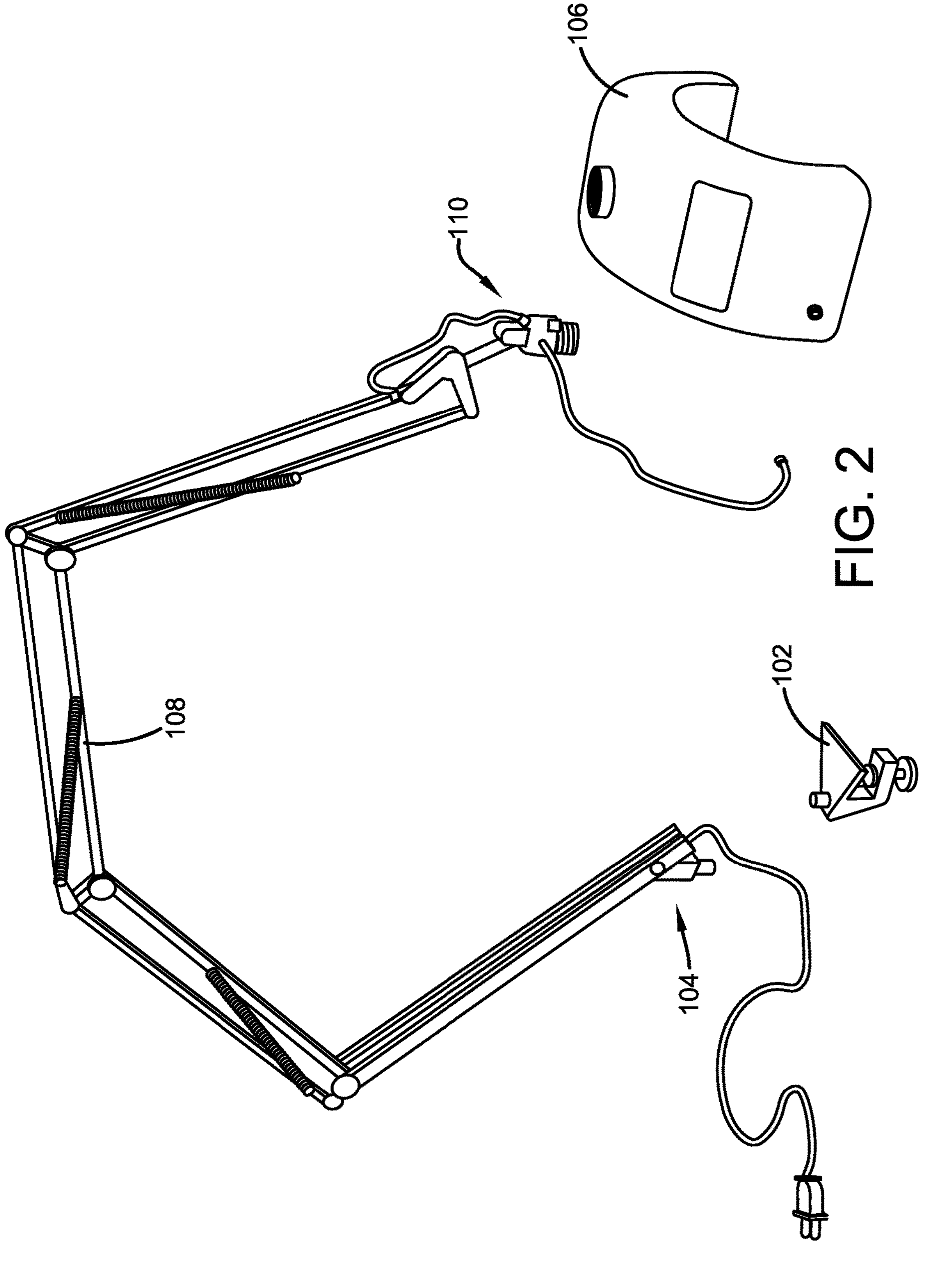
FIG. 2 illustrates an exploded view of one potential embodiment of an attachable pedicure lamp device of the present invention in accordance with the disclosed architecture.

More specifically, the device 100 is comprised of a base fastener 102, as seen in FIG. 2, designed to attach to various surfaces such as, but not limited to, pedicure carts, tables, or armrests. The base fastener 102 is preferably a clamp and may include types such as, but not limited to, screw clamps, spring-loaded clamps, or quick-release clamps. Alternatively, the base fastener 102 may be other fastening mechanisms, such as, but not limited to, clips, magnets, or suction-based fasteners, ensuring compatibility with diverse surface types and user preferences. The fastener 102 is preferably comprised of a joint 104, which is optimally configured as a 360-degree swivel joint. The joint 104 allows movement around at least two axes: a vertical axis for side-to-side rotation and a horizontal axis for forward and backward tilting. This enables independent movement of at least one adjustable arm 108 of the device 100, allowing precise positioning without requiring the repositioning of the entire device 100.

The device 100 is further comprised of a pedicure lamp 106 that provides optimal lighting conditions specifically designed for nail treatments. The pedicure lamp 106 is connected to the adjustable arm 108 via a joint 110, which is preferably a ball-and-socket joint. The joint 110 permits full 360-degree rotation around both vertical and horizontal axes, as well as multidirectional tilting. This allows users to achieve precise light placement for treatments involving both hands and feet. Alternatively, the joint 110 may be other repositionable joint types, such as hinge joints, threaded joints, telescopic joints, etc. to accommodate different usage scenarios. The joint 110 may also be comprised of a locking mechanism 112 that ensures the lamp 106 can be securely locked in a desired position, thereby maintaining stability during extended use. The locking mechanism 112 may include types such as friction-based locks, gear-based mechanisms with interlocking teeth, spring-loaded pins that engage with preset notches, or screw-tightened collars for enhanced stability.

The lamp head 106 is comprised of a light source 114, as seen in FIG. 1, that may include UV and/or LED lighting to support curing processes for gel polish, shellac, and traditional nail polishes. The UV light sources may emit wavelengths between approximately 340-400 nanometers (nm), suitable for curing UV-specific gel products. The LED light sources may include a range of wavelengths, such as 365-405 nm for gel curing and 500-700 nm for additional visible light to enhance illumination during detailed treatments. In embodiments featuring a plurality of light sources 114, each light source 114 may be independently controlled via at least one button 116, allowing users to select specific light types or intensities based on their needs. The lamp head 106 is further comprised of a programmable timer 118, which offers pre-set durations of 10, 30, 60, and 90 seconds. An LED display 120 is positioned on the lamp head 106 to ensure clear visibility and straightforward control over the timer settings. Additionally, the lamp head 106 is comprised of at least one sensor 122 configured to automatically activate the light source 114 when a hand or foot is detected within the lamp head 106 and deactivate the light source 114 upon removal. The lamp head 106 is preferably curved to ensure even light distribution, minimizing shadows and reducing the need for repositioning. Moreover, the lamp head 106 may be comprised of a reflective inner surface 124 to enhance light diffusion and ensure uniform intensity across all treated nails.

The adjustable arm 108 of the device 100 may be any arm type, such as, but not limited to, a flexible gooseneck arm with a steel-reinforced silicone core or a multi-jointed arm with at least one pivot point 126, as seen in FIG. 1. The arm 108 is preferably comprised of at least one integrated cable fastener 128, which may be in the form of a clip, channel, or other securing mechanism designed to manage the power cord 130. This feature maintains a clean, professional appearance by preventing tangling or obstruction.

The device 100 may be powered by a rechargeable lithium-ion battery 132, which is comprised of at least one charging port 134, such as USB-C or micro-USB, to support convenient recharging. Alternatively, the device 100 may be powered by a power cord 130. The lamp head 106 includes LED indicators 136 that display the battery status, with color-coded lights for quick assessment. For instance, a low-battery warning in a first color is activated when the charge level falls below 20%. The power cord 130 is routed through or along the adjustable arm 108 to reduce tangling and preserve a sleek, professional aesthetic.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "attachable pedicure lamp device" and "device" are interchangeable and refer to the attachable pedicure lamp device 100 of the present invention.

Notwithstanding the forgoing, the attachable pedicure lamp device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the attachable pedicure lamp device 100 as shown in the FIGS. are for illustrative purposes only, and that many other sizes and shapes of the attachable pedicure lamp device 100 are well within the scope of the present disclosure. Although the dimensions of the attachable pedicure lamp device 100 are important design parameters for user convenience, the attachable pedicure lamp device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An attachable pedicure lamp device comprising:

a base fastener comprising a first joint configured to provide movement around a vertical axis of the base fastener and a horizontal axis of the base fastener;

an adjustable arm connected to the first joint of the base fastener, the adjustable arm being repositionable relative to the first joint;

a pedicure lamp connected to the adjustable arm via a second joint;

a plurality of light sources disposed within the pedicure lamp, the plurality of light sources configured to emit light for curing nail products;

a sensor configured to detect the presence of a hand or a foot within the pedicure lamp and automatically activate or deactivate the light source in response; and an LED display disposed on the pedicure lamp;

wherein the base fastener is a quick-release clamp; and wherein the plurality of light sources comprise at least one UV light and an independently controlled visible light LED light.

2. The attachable pedicure lamp device of claim 1, wherein the adjustable arm is comprised of a multi-jointed arm comprised of a pivot point.

3. The attachable pedicure lamp device of claim 1 further comprised of a power cord.

4. The attachable pedicure lamp device of claim 1, wherein the sensor is comprised of a motion sensor.

5. The attachable pedicure lamp device of claim 1, wherein the pedicure lamp is comprised of a reflective inner surface.

6. The attachable pedicure lamp device of claim 1, wherein the first joint is comprised of a swivel joint.

7. The attachable pedicure lamp device of claim 1 further comprised of a battery.

8. The attachable pedicure lamp device of claim 7 further comprised of an LED indicator.

9. The attachable pedicure lamp device of claim 8, wherein the LED indicator displays a battery life of the battery.

* * * * *